US012485550B2

(12) United States Patent
Ling et al.

(10) Patent No.: US 12,485,550 B2
(45) Date of Patent: Dec. 2, 2025

(54) VISION GUIDANCE SYSTEM FOR MATING A GEARBOX TO A MOTOR

(71) Applicant: FCA US LLC, Auburn Hills, MI (US)

(72) Inventors: Xujin Ling, Shanghai (CN); Dawei Li, Shanghai (CN); Zhongwei Lu, Shanghai (CN); Yi Ju, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 86 days.

(21) Appl. No.: 18/609,089

(22) Filed: Mar. 19, 2024

(65) Prior Publication Data

US 2025/0296236 A1 Sep. 25, 2025

(51) Int. Cl.
*B25J 9/16* (2006.01)
*B23P 19/02* (2006.01)
*B25J 13/08* (2006.01)

(52) U.S. Cl.
CPC ............. *B25J 9/1697* (2013.01); *B23P 19/02* (2013.01); *B25J 13/08* (2013.01)

(58) Field of Classification Search
CPC .......... B25J 9/1697; B25J 13/08; B23P 19/02
See application file for complete search history.

(56) References Cited

U.S. PATENT DOCUMENTS

| 11,638,618 | B2 * | 5/2023 | Schuh | A61G 13/08 |
| | | | | 606/1 |
| 11,951,618 | B2 * | 4/2024 | Li | B25J 9/0084 |
| 12,075,992 | B1 * | 9/2024 | Hairrell | A61B 34/30 |
| 12,242,180 | B1 * | 3/2025 | Nikulla | B25J 15/04 |
| 12,318,165 | B2 * | 6/2025 | Roeder | A61B 34/37 |
| 2002/0083579 | A1 * | 7/2002 | Suhara | H05K 13/041 |
| | | | | 29/739 |
| 2014/0115857 | A1 * | 5/2014 | Hatano | B23P 19/107 |
| | | | | 464/106 |
| 2020/0154637 | A1 * | 5/2020 | Doughty | A01D 34/78 |
| 2022/0125452 | A1 * | 4/2022 | Dolan | A61B 17/22012 |
| 2022/0314466 | A1 * | 10/2022 | Al | F16H 49/001 |
| 2023/0108220 | A1 * | 4/2023 | Van Der Weijde | B25J 9/1687 |
| | | | | 320/109 |
| 2023/0266681 | A1 * | 8/2023 | Swillam | G03F 9/7088 |
| | | | | 356/399 |
| 2024/0235339 | A1 * | 7/2024 | Shin | B23P 19/02 |
| 2025/0021010 | A1 * | 1/2025 | Schweigert | G03F 7/7095 |
| 2025/0083313 | A1 * | 3/2025 | Sachdev | B25J 15/08 |

FOREIGN PATENT DOCUMENTS

JP H07241733 A 9/1995

OTHER PUBLICATIONS

Kumar et al., Misalignment Effect on Gearbox Failure: An Experimental Study, Sep. 28, 2020, Elsevier, pp. 1-11 (Year: 2020).*

* cited by examiner

*Primary Examiner* — Sze-Hon Kong
(74) *Attorney, Agent, or Firm* — Jeremy J. Klobucar

(57) ABSTRACT

A vision guidance system for mating a first shaft having a male splined end and a second shaft having a female splined end. The vision guidance system may include a control device, a first camera having an anamorphic lens in communication with the control device and configured to generate images of the male splined end, a second camera having a conventional lens in communication with the control device and configured to generate images of the female splined end, and an adjustment device in communication with the control device and configured to modify an orientation of the female splined end.

18 Claims, 5 Drawing Sheets

VISION GUIDANCE SYSTEM FOR MATING A GEARBOX TO A MOTOR

FIELD

The present disclosure relates to a vision guidance system for mating a gearbox to a motor.

BACKGROUND

This section provides background information related to the present disclosure which is not necessarily prior art.

Battery-powered electric vehicles use an electric motor to drive the wheels of the vehicle. To transfer power generated by electric motor to the wheels of the vehicle, the electric motor is coupled to a gearbox. In this regard, the electric motor includes a stator and a rotor. During rotation of the rotor relative to the stator, an electric current is produced. The rotor may include a rotor shaft that is rotatably connected to an input shaft of the gearbox. A distal end of the rotor shaft that is connected to the input shaft may be a male splined end that is configured to mate with a correspondingly splined female end of the input shaft.

During manufacture of the vehicle, the male splined end of the rotor shaft is required to be mated with the splined female end of the input shaft before the gearbox and electric motor can be installed on the vehicle. If the splines of the male splined end of the rotor shaft are not phased with the splines of the female splined end of the input shaft, however, multiple attempts may be required to properly phase the male splined end of the rotor shaft with the female splined end of the input shaft, which can be time-consuming and slow the vehicle assembly process. Thus, it is desirable for the male splined end of the rotor shaft to be properly phased with the female splined end of the input shaft, or vice versa, to decrease the time required to mate the rotor shaft with the input shaft and decrease the amount of time necessary to manufacture the vehicle.

SUMMARY

This section provides a general summary of the disclosure, and is not a comprehensive disclosure of its full scope or all of its features.

According to a first aspect of the present disclosure, there is provided a vision guidance system for mating a first shaft having a male splined end and a second shaft having a female splined end. The vision guidance system includes a control device; a first camera having an anamorphic lens and in communication with the control device, the first camera being configured to generate images of the male splined end; a second camera having a conventional lens and in communication with the control device, the second camera being configured to generate images of the female splined end; and an adjustment device in communication with the control device and configured to modify an orientation of either the male splined end or the female splined end, wherein the control device is configured to analyze the images of the male splined end and the female splined end to determine whether a phase of the male splined end matches a phase of the female splined end such that the first shaft can be mated with the second shaft, if the control device determines that the phase of the male splined end does not match the phase of the female splined end, the control device is configured to determine an amount of phase correction that is necessary for the female splined end so that the first shaft can be mated with the second shaft, and based on the determined amount of phase correction, the control device is configured to instruct the adjustment device to correct the phase of the female splined so that the first shaft can be mated with the second shaft.

According to the first aspect, the first shaft is a rotor shaft of an electric motor and the second shaft is an input shaft of a gearbox.

According to the first aspect, the adjustment device includes a servo motor in communication with the control device and a rotatable shaft connected to the servo motor that is configured to mate with a gear of the gearbox that is connected to the input shaft, and upon actuation of the servo motor, the rotatable shaft is configured to rotate the gear to rotate the input shaft and correct the phase of the female splined end.

According to the first aspect, the system may also include at least one gripping device for manipulating one of the first shaft and the second shaft relative to the other to mate the first shaft and the second shaft.

According to the first aspect, the at least one gripping device is a robot.

According to the first aspect, the robot is configured to move each of the first shaft and the second shaft to positions proximate the first camera and the second camera so that the first camera generate images of the male splined end of the first shaft and the female splined end of the second shaft.

According to the first aspect, the male splined end includes a plurality of first axially extending splines and the female splined end includes a plurality of second axially extending splines configured to mate with the plurality of first axially extending splines.

According to the first aspect, the anamorphic lens distorts the image of the male splined end so that each of the plurality of first axially extending splines are visible in the image.

According to the first aspect, the first camera and the second camera are each movable relative to the male splined end and the second splined end, respectively.

According to a second aspect of the present disclosure, there is provided a method for aligning and mating a first shaft having a male splined end and a second shaft having a female splined end. The method may include generating at least one image of the male splined end using a first camera having an anamorphic lens and in communication with a control device; generating at least one image of the female splined end using a second camera having a conventional lens and in communication with the control device; communicating the at least one image of the male splined end and the at least one image of the female splined end to the control device; analyzing, with the control device, the images of the male splined end and the female splined end to determine whether a phase of the male splined end matches a phase of the female splined end such that the first shaft can be mated with the second shaft, and if it is determined that the phase of the male splined end does not match the phase of the female splined end, determining an amount of phase correction that is necessary for the female splined end so that the first shaft can be mated with the second shaft; and after the determining whether the phase of the male splined end matches the phase of the female splined end, either mating the male splined end of the first shaft with the female splined end of the second shaft or using an adjustment device to correct the phase of the female splined so that the first shaft can be mated with the second shaft, and then mating the male splined end of the first shaft with the female splined end of the second shaft.

According to the second aspect, the first shaft is a rotor shaft of an electric motor and the second shaft is an input shaft of a gearbox.

According to the second aspect, the adjustment device includes a servo motor in communication with the control device and a rotatable shaft connected to the servo motor that is configured to mate with a gear of the gearbox that is connected to the input shaft, and upon actuation of the servo motor, the rotatable shaft is configured to rotate the gear to rotate the input shaft and correct the phase of the female splined end.

According to the second aspect, the method may further include using at least one gripping device to manipulate one of the first shaft and the second shaft relative to the other to mate the first shaft and the second shaft.

According to the second aspect, the at least one gripping device is a robot.

According to the second aspect, the method may further include using the robot to move each of the first shaft and the second shaft to positions proximate the first camera and the second camera so that the first camera can generate images of the male splined end of the first shaft and the female splined end of the second shaft.

According to the second aspect, the male splined end includes a plurality of first axially extending splines and the female splined end includes a plurality of second axially extending splines configured to mate with the plurality of first axially extending splines.

According to the second aspect, the anamorphic lens distorts the image of the male splined end so that each of the plurality of first axially extending splines are visible in the image.

According to the second aspect, the method may further include moving the first camera and the second camera relative to the male splined end and the second splined end, respectively, to generate the images thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 schematically illustrates a vision guidance system for aligning a rotor shaft of an electric motor with an input shaft of a gearbox according to a principle of the present disclosure;

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
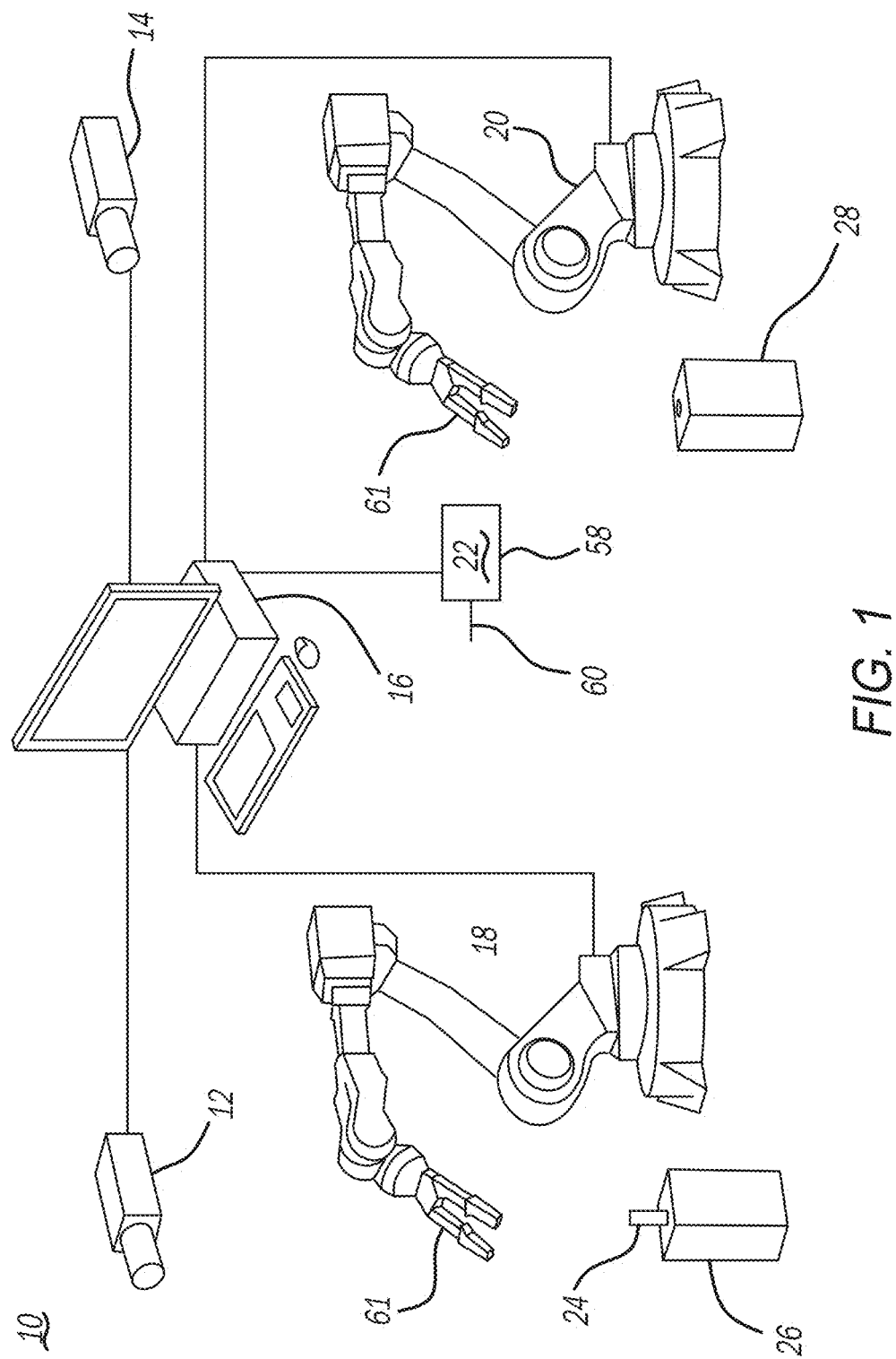

FIG. 1 schematically illustrates a vision alignment system 10 according to a principle of the present disclosure. Vision alignment system 10 includes a first camera 12 and a second camera 14, a control device 16, a pair of gripping apparatuses 18 and 20, and an adjustment mechanism 22. Vision alignment system 10 is configured to align a rotor shaft 24 of an electric motor 26 with an input shaft (not shown in FIG. 1) of a gearbox 28, as will be described in more detail later.

Figure 2:
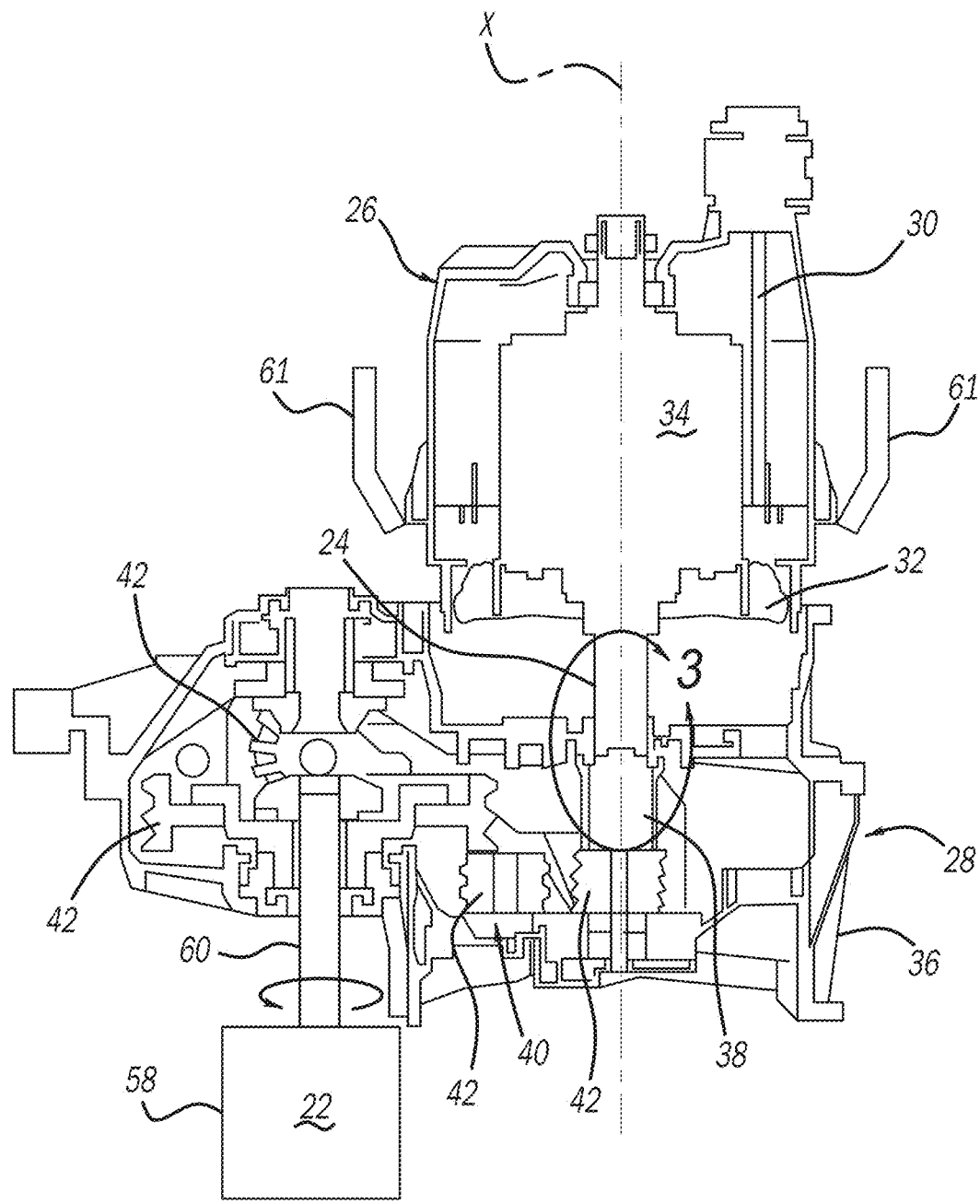
FIG. 2 is a perspective cross-sectional view of an electric motor coupled to a gearbox having a rotor shaft and input shaft, respectively, that are aligned using the vision guidance system illustrated in FIG. 1.
Figure 3:
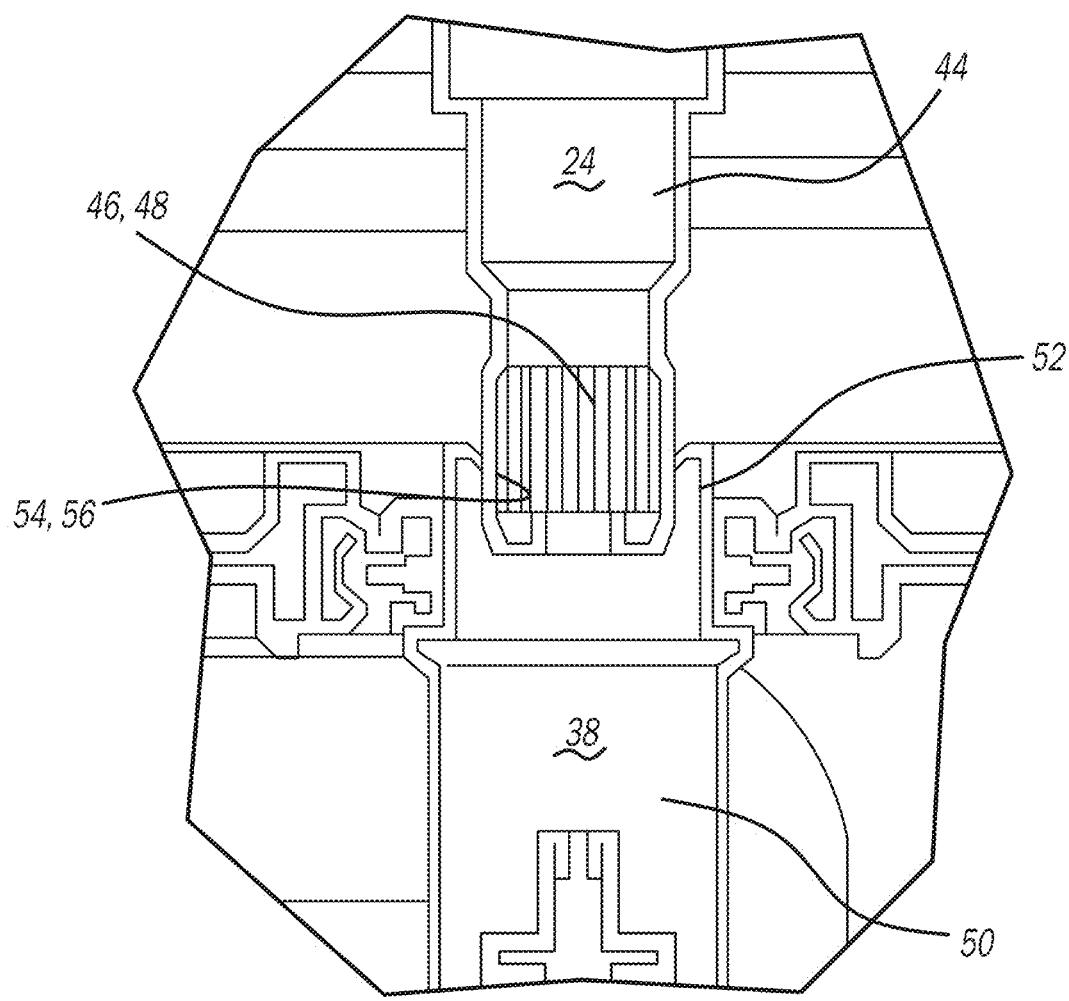
FIG. 3 is an enlarged perspective cross-sectional view illustrating the connection between the rotor shaft and input shaft illustrated in FIG. 2.

Now referring to FIG. 2, an example coupling between electric motor 26 and gearbox 28 is illustrated. Electric motor 26 includes a housing 30 that contains a stator 32 and a rotor 34 having rotor shaft 24. Gearbox 28 includes a casing 36 that contains an input shaft 38 configured to mate with rotor shaft 24. Rotor shaft 24 is configured to rotate input shaft 38 when input shaft 38 is coupled with rotor shaft 24. As input shaft 38 is rotated, the rotation of input shaft 38 is transferred to a gear assembly 40 including a plurality of gears 42 that are collectively mated as is known in the art. Although not shown in FIG. 2, it should be understood that rotation of input shaft 38 by rotor shaft 24 drives at least one wheel (not shown) of a vehicle that is connected to a wheel shaft (not shown) that is connected to one of the gears 42 of gearbox 28, as is known in the art Now referring to FIG. 3, the connection between rotor shaft 24 and input shaft 38 is shown in greater detail. In this regard, it can be seen that rotor shaft 24 includes a proximal end 44 attached to rotor 34 and a distal end 46 that includes a plurality of axially extending first splines 48. Input shaft 38 includes a proximate end 50 attached to gear assembly 40 and a terminal end 52 that defines a cup-shaped recess 54 having a plurality of axially extending second splines 56 formed about a circumference thereof. Put another way, distal end 46 of rotor shaft 24 defines a male splined end and terminal end 52 of input shaft 38 defines a female splined end that are configured to mate with one another such that rotation of rotor shaft 24 will also rotate input shaft 38.

Inasmuch as distal end 46 of rotor shaft 24 and terminal end 52 of input shaft 38 are designed to mate with one another, it is important during connection of distal end 46 to terminal end 52 that, firstly, rotor shaft 24 and input shaft 38 are axially aligned along an axis X and, secondly, that the axially extending first splines 48 are correctly phased relative to the axially extending second splines 56. If the axially extending first splines 48 are not correctly phased relative to the axially extending second splines 56, the first splines 48 may axially abut the second splines 56 and preclude rotor shaft 24 from properly mating with input shaft 38. In other words, the first splines 48 must be phased relative to the second splines 56 such that when distal end 46 of rotor shaft 24 is mated with terminal end 52 of input shaft 38, the first splines 48 fit between the second splines 56. Otherwise, additional time and manipulation of motor 26 and/or gearbox 28 may be necessary that can slow the mating process, which can lead to a bottleneck at this point of the vehicle manufacturing process, which is undesirable.

Thus, in order to ensure that first splines 48 are properly phased relative to the second splines 56, vision guidance system 10 includes first and second cameras 12 and 14 for taking images of first splines 48 and second splines 56, respectively. Images captured by first and second cameras 12 and 14 are then transmitted to control device 16 for comparison using a software program stored on a computer readable storage medium of control device 16. After comparison of the images captured by first and second cameras 12 and 14 that first splines 48 are correctly phased relative to second splines 56, motor 26 may be manipulated relative to gearbox 26 to mate rotor shaft 24 with input shaft 38. If after comparison of the images captured by first and second cameras 12 and 14 by control device 16 it is determined that first splines 48 are not correctly phased relative to second splines 56, the phase of second splines 56 can be adjusted to ensure proper mating between the first 48 and second splines 56 as will be described in more detail later.

Figure 4:
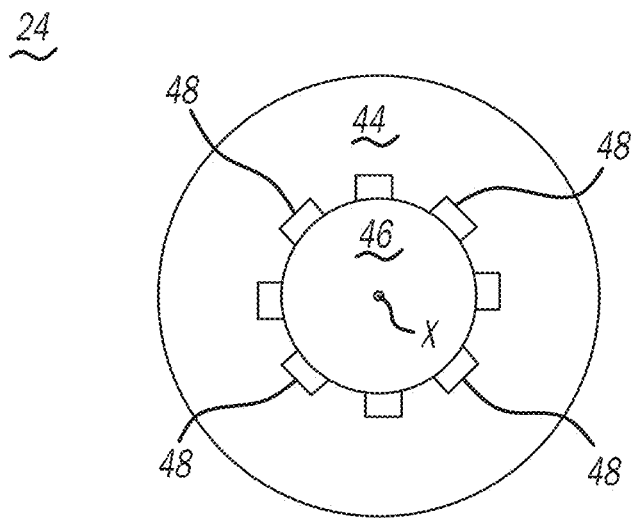
FIG. 4 illustrates a splined male end of the rotor shaft illustrated in FIG. 3 as viewed by the vision guidance system illustrated in FIG. 1.
Figure 5:
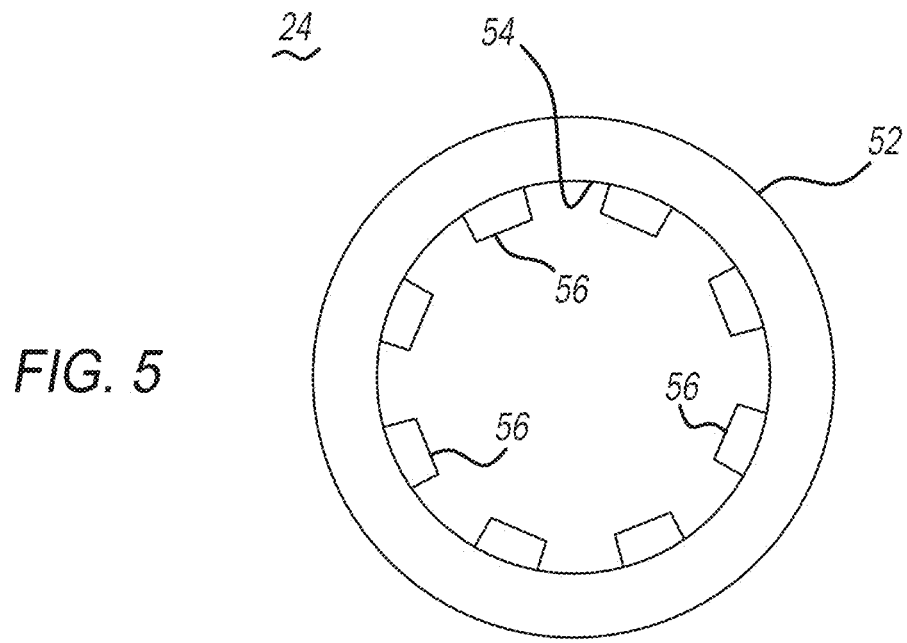
FIG. 5 illustrates a splined female end of the input shaft illustrated in FIG. 3 as viewed by the vision guidance system illustrated in FIG. 1.

FIG. 4 illustrates distal end 46 of rotor shaft 24 when viewed along the axis X, and FIG. 5 illustrates terminal end 52 of input shaft 38 when viewed along the axis X. Similar images may be obtained using first and second cameras 12 and 14. It is important to note, however, that first and second cameras 12 and 14 do not use the same lens system when taking images.

More specifically, while one of the cameras (e.g., second camera 14 configured to generate images of terminal end 52 of input shaft 38) may use a conventional lens to provide an image similar to that shown in FIG. 5 that shows the second splines 56 around an entire 360 degree circumference of recess 54, it can be more difficult for the same camera to provide an image of the distal end 46 of rotor shaft 24 similar to that illustrated in FIG. 4 where each of the first splines 48 around a circumference of distal end 46 of rotor shaft 24 are illustrated. In this regard, a conventional lens may not generate an image where each of the first splines 48 are viewable such that a phase of the first splines 48 can be compared to a phase of the second splines 56 using control device 16 to ensure that the phases are correctly aligned for mating between rotor shaft 24 and input shaft 38. In view of the above, the present disclosure uses first camera 12 having an anamorphic lens to take images of distal end 46 and each of the first splines 48 positioned about the circumference thereof.

An anamorphic lens consists of a regular spherical lens, plus an anamorphic attachment (or an integrated lens element) that does the anamorphosing. The anamorphic element operates at infinite focal length, so that it has little or no effect on the focus of the primary lens it is mounted on but still anamorphoses (distorts) the optical field. By distorting the optical field, each of the first splines 48 can be imaged using first camera 12.

After at least one image of rotor shaft 24 has been taken using first camera 12 having the anamorphic lens and at least one image of input shaft 28 have been taken using second camera 14 using a conventional lens, the images are communicated to control device 16, which may be a computer, tablet, or some other type of control device known to one skilled in the art. Control device 16 is configured to analyze the images and determine the phases of first splines 46 and second splines 56. If the phases are correctly aligned, rotor shaft 24 can then be mated with input shaft 38.

If control device determines that the phases of first splines 46 and second splines 56 are not correctly aligned, control device 16 may be configured to generate an alert that the phase of one of either rotor shaft 24 or input shaft 38 should be corrected. Further, control device 16 may be configured to determine an amount of rotation (e.g., one degree, two degrees, three degrees, etc.) of one of either rotor shaft 24 or input shaft 38 to correctly match the phase of first splines 48 or second splines 56 to the other. To correct the phase of either the first splines 48 or second splines 56, adjustment mechanism 22 may be used.

Adjustment mechanism 22 may include a servo motor 58 connected to a rotatable shaft 60 that, in the illustrated embodiment shown in FIG. 2, is configured to mate with one of the gears 42 of gear assembly 40. As shown in FIG. 2, servo motor 58 may be in communication with and configured to be controlled by control device 16. Once rotatable shaft 60 is mated with one of the gears 42 of gear assembly 40, control device 16 can instruct servo motor 58 to rotate shaft 60 the desired amount (e.g., one degree, two degrees, three degrees, etc.) to correct the phase of second splines 56 to correspond to the phase of first splines 48 of rotor shaft 24. In this regard, rotation of rotatable shaft 60 will rotate the gears 42 of gear assembly 40, which will subsequently rotate input shaft 38. After correction of the phase of second splines 56, rotor shaft 24 may be mated with input shaft 38.

It should be understood that it is easier to adjust the phase of the second splines 56 of input shaft 38 due to the gear ratio between the input shaft 38 and the gear assembly 40. Due to the gear ratio between the input shaft 38 and the gear assembly 40, rotation of rotatable shaft 60 by servo motor 58 can easily adjust to a minor degree (i.e., even to an extent less than one degree) the phase of the second splines 56 of input shaft 38. Meanwhile, it is more difficult to rotate the rotor shaft 24 to such a minor degree as may be required to correct the phase of the first splines 48 relative to the second splines 56. Accordingly, while the phase of first splines 48 can also be corrected relative to the second splines 56, it is preferable that the phase of second splines 56 is corrected relative to the phase of the first splines 48 in order to increase productivity.

Figure 6:
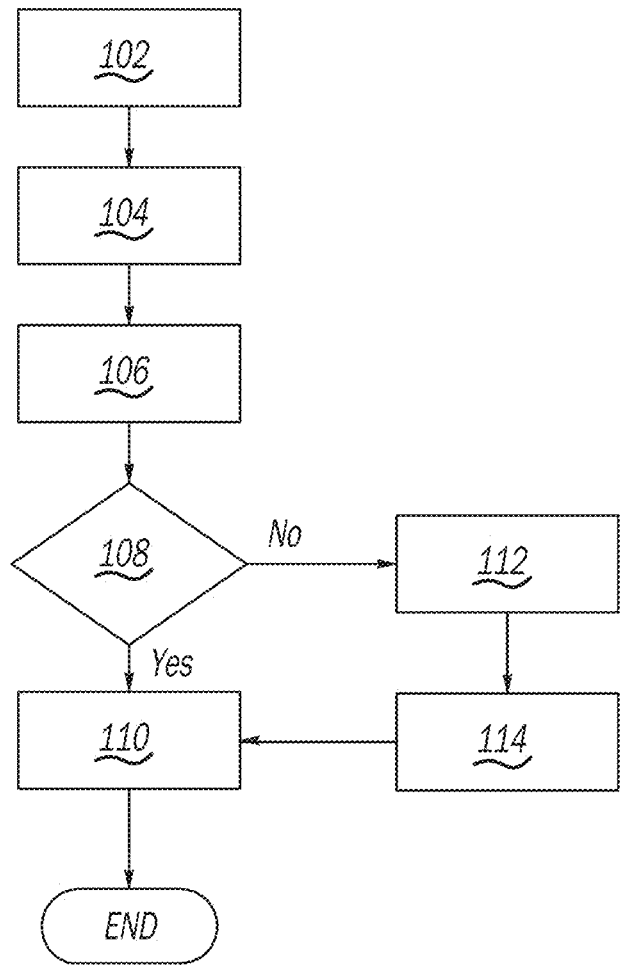
FIG. 6 illustrates a flow chart of a method of using the vision guidance system illustrated in FIG. 1

Now referring to FIG. 6, a method 100 of operating vision guidance system 10 will be described. Firstly, at step 102, each of motor 26 and gearbox 28 may be grasped by grippers 61 of gripping devices 18 and 20 and moved to positions proximate first and second cameras 12 and 14 for imaging of rotor shaft 24 and input shaft 38. While gripping devices 19 and 20 in the embodiment shown in FIG. 1 are illustrated as being multi-axis robots 62 that are in communication and can be controlled by control device 16, it should be understood that other devices may be used for moving/manipulating motor 26 and gearbox 28 relative to first and second cameras 12 and 14.

For example, instead of using robots 62 to grip and manipulate motor 26 and gearbox 28, motor 26 and gearbox 28 may be located on carts or some other type of support that move along or are movable along an assembly line having various stations or cells (not shown). At the station or cell where motor 26 is to be mated with gearbox 26, the supports including motor 26 and gearbox 28, respectively, can be moved relative to first and second cameras 12 and 14 (which may be located at fixed locations) for imaging thereof. Another alternative is that motor 26 and gearbox 28 move along an assembly line beneath cameras 12 and 14 and images thereof are taken as motor 26 and gearbox 28 move beneath cameras 12 and 14. Yet another alternative is that first and second cameras 12 and 14 are hand-held devices that are moved relative to rotor shaft 24 and input shaft 38, and images taken therewith are uploaded to control device 16 either wirelessly or by using a wired connection. Regardless of the manner in which motor 26 and gearbox 28 are positioned near first and second cameras 12 and 14, respectively, the primary aspect to keep in mind is that first camera 12 having the anamorphic lens is used to image the first splines 48 of distal end 46 of rotor shaft 24 and second camera 14 having a conventional lens is used to image the second splines 56 of recess 54 of input shaft 38 so that the phases of the first and second splines 48 and 56 can be determined by control device 16.

Next, after rotor shaft 24 of motor 26 and input shaft 38 of gearbox are located proximate first camera 12 and second camera 14, first camera 12 takes at least one image of rotor shaft 24 along the axis X and second camera 14 takes at least one image of input shaft 38 along the axis X (step 104). After the image(s) are obtained by first and second cameras 12 and 14, the images are communicated to control device 16 for analysis thereof (step 106). Then, at step 108 it is determined using control device 16 whether the phase of first splines 48 of rotor shaft 24 matches the phase of second splines 56 of input shaft 38.

If the phase of first splines 48 of rotor shaft 24 is determined by control device 16 to match the phase of second splines 56 of input shaft 38, the method may proceed to step 110 where rotor shaft 24 is mated with input shaft 38. This can be done by using gripping devices 16 and 18 to manipulate motor 26 relative to gearbox 28 such that rotor shaft 24 and input shaft 38 are aligned along the axis X and then mated. While not illustrated in FIG. 1, at least one of the gripping devices 16, 18 may be equipped with a force sensor that is configured to generate a signal indicative of an increase in force when rotor shaft 38 is properly seated in recess 54 of input shaft 38.

If the phase of first splines 48 of rotor shaft 24 is determined by control device 16 to not match the phase of second splines 56 of input shaft 38, the method may proceed to step 112 where control device 16 determines the amount of correction (e.g., one degree, two degrees, three degrees, etc.) that needs to be applied to the phase of input shaft 38, which is communicated to adjustment mechanism 22 (i.e., servo motor 58). Then, at step 114, the rotatable shaft 60 of adjustment mechanism 22 is mated with one of the gears 42 of gear assembly 40 of gearbox 28 and servo motor 58 is operated based on the instruction received from control device 16 to rotate the gears 42 of gear assembly 40 an extent that will in turn rotate the input shaft 38 the proper amount to ensure phase matching between the first splines 48 of rotor shaft 24 and the second splines 56 of input shaft 38.

The adjustment mechanism 22 may be at a fixed location and gearbox 28 manipulated by robot 18 to mate the rotatable shaft 60 of adjustment mechanism 22 into engagement with the gear assembly 40, or adjustment mechanism 22 may be attached to another robot (not shown) and manipulated relative to gearbox 28, or adjustment mechanism 22 may be handheld and manipulated relative to gearbox 28. In any of these cases, the primary aspect to keep in mind is that the phase of second splines 56 is corrected the proper amount based on instructions received from control device 16. Then, after the phase is corrected, the method may proceed to 110 where rotor shaft 24 of motor 26 is mated with input shaft 38 of gearbox 28 and the method ends.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vision guidance system for mating a first shaft having a male splined end and a second shaft having a female splined end, the vision guidance system comprising:
    a control device;
    a first camera having an anamorphic lens and in communication with the control device, the first camera being configured to generate images of the male splined end;
    a second camera having a conventional lens and in communication with the control device, the second camera being configured to generate images of the female splined end; and
    an adjustment device in communication with the control device and configured to modify an orientation of the female splined end,
    wherein the control device is configured to analyze the images of the male splined end and the female splined end to determine whether a phase of the male splined end matches a phase of the female splined end such that the first shaft can be mated with the second shaft,
    if the control device determines that the phase of the male splined end does not match the phase of the female splined end, the control device is configured to determine an amount of phase correction that is necessary for the female splined end so that the first shaft can be mated with the second shaft, and
    based on the determined amount of phase correction, the control device is configured to instruct the adjustment device to correct the phase of the female splined so that the first shaft can be mated with the second shaft.

2. The system according to claim 1, wherein the first shaft is a rotor shaft of an electric motor and the second shaft is an input shaft of a gearbox.

3. The system according to claim 2, wherein the adjustment device includes a servo motor in communication with the control device and a rotatable shaft connected to the servo motor that is configured to mate with a gear of the gearbox that is connected to the input shaft, and upon actuation of the servo motor, the rotatable shaft is configured to rotate the gear to rotate the input shaft and correct the phase of the female splined end.

4. The system according to claim 1, further comprising at least one gripping device for manipulating one of the first shaft and the second shaft relative to the other to mate the first shaft and the second shaft.

5. The system according to claim 4, wherein the at least one gripping device is a robot.

6. The system according to claim 5, wherein the robot is configured to move each of the first shaft and the second shaft to positions proximate the first camera and the second camera so that the first camera generate images of the male splined end of the first shaft and the female splined end of the second shaft.

7. The system according to claim 1, wherein the male splined end includes a plurality of first axially extending splines and the female splined end includes a plurality of second axially extending splines configured to mate with the plurality of first axially extending splines.

8. The system according to claim 7, wherein the anamorphic lens distorts the image of the male splined end so that each of the plurality of first axially extending splines are visible in the image.

9. The system according to claim 1, wherein the first camera and the second camera are each movable relative to the male splined end and the second splined end, respectively.

10. A method for aligning and mating a first shaft having a male splined end and a second shaft having a female splined end, the method comprising:
generating at least one image of the male splined end using a first camera having an anamorphic lens and in communication with a control device;
generating at least one image of the female splined end using a second camera having a conventional lens and in communication with the control device;
communicating the at least one image of the male splined end and the at least one image of the female splined end to the control device;
analyzing, with the control device, the images of the male splined end and the female splined end to determine whether a phase of the male splined end matches a phase of the female splined end such that the first shaft can be mated with the second shaft, and if it is determined that the phase of the male splined end does not match the phase of the female splined end, determining an amount of phase correction that is necessary for the female splined end so that the first shaft can be mated with the second shaft; and
after the determining whether the phase of the male splined end matches the phase of the female splined end, either:
mating the male splined end of the first shaft with the female splined end of the second shaft; or
using an adjustment device to correct the phase of one of the female splined so that the first shaft can be mated with the second shaft, and then mating the male splined end of the first shaft with the female splined end of the second shaft.

11. The method according to claim 10, wherein the first shaft is a rotor shaft of an electric motor and the second shaft is an input shaft of a gearbox.

12. The method according to claim 11, wherein the adjustment device includes a servo motor in communication with the control device and a rotatable shaft connected to the servo motor that is configured to mate with a gear of the gearbox that is connected to the input shaft, and upon actuation of the servo motor, the rotatable shaft is configured to rotate the gear to rotate the input shaft and correct the phase of the female splined end.

13. The method according to claim 10, further comprising using at least one gripping device to manipulate one of the first shaft and the second shaft relative to the other to mate the first shaft and the second shaft.

14. The method according to claim 13, wherein the at least one gripping device is a robot.

15. The method according to claim 14, further comprising using the robot to move each of the first shaft and the second shaft to positions proximate the first camera and the second camera so that the first camera can generate images of the male splined end of the first shaft and the female splined end of the second shaft.

16. The method according to claim 10, wherein the male splined end includes a plurality of first axially extending splines and the female splined end includes a plurality of second axially extending splines configured to mate with the plurality of first axially extending splines.

17. The method according to claim 16, wherein the anamorphic lens distorts the image of the male splined end so that each of the plurality of first axially extending splines are visible in the image.

18. The method according to claim 10, further comprising moving the first camera and the second camera relative to the male splined end and the second splined end, respectively, to generate the images thereof.

* * * * *